Nov. 16, 1926.
E. McKENZIE
WINDSHIELD WIPER
Filed Jan. 5, 1925
1,607,268
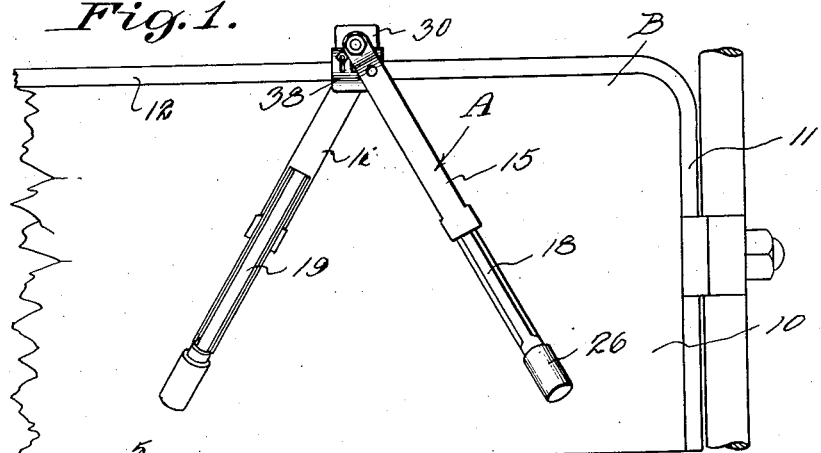
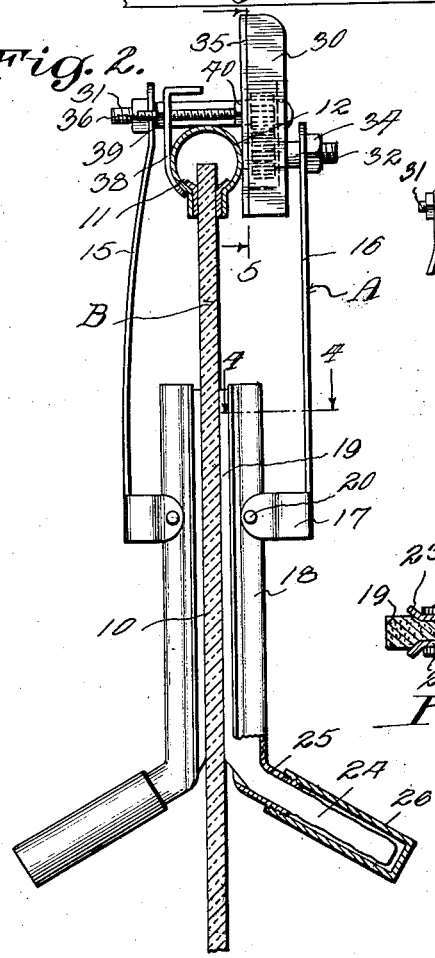
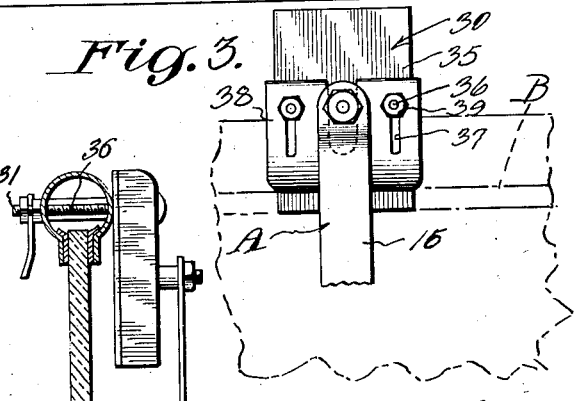
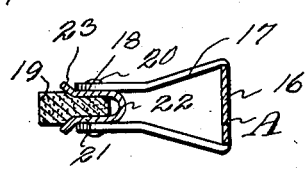
E. McKenzie, Inventor
By Richard B. Owen, Attorney Patented Nov. 16, 1926.

1,607,268

UNITED STATES PATENT OFFICE.

ELLIOT McKENZIE, OF MOUNTAIN IRON, MINNESOTA, ASSIGNOR OF ONE-THIRD TO ALFRED R. OLSTAD, OF VIRGINIA, MINNESOTA, AND ONE-THIRD TO ERNEST T. HEINSON, OF MOUNTAIN IRON, MINNESOTA.

WINDSHIELD WIPER.

Application filed January 5, 1925. Serial No. 698.

This invention appertains to novel cleaning devices for cleaning wind shields of motor vehicles and the like and the primary object of the invention is to provide novel means for supplying an anti-freezing fluid to the wiping elements for preventing the freezing of snow and the like on the wind shield.

A further object of the invention is to provide a double wind shield cleaner for engaging the opposite faces of the wind shield and novel means for moving the wiping element in opposite directions, so as to prevent binding thereof on the wind shield.

A further object of the invention is the provision of novel resilient arms for supporting the wiping element, whereby the same will be normally urged into proper contact with the wind shield.

A further object of the invention is the provision of novel holders for retaining the wiping elements in place and novel means for pivotally connecting the holders to resilient arms, whereby the wiping element will be properly disposed relative to the wind shield irrespective of the angle of the supporting bracket for the arms relative to the wind shield.

A further object of the invention is the provision of novel hollow handles carried by the holders for the wiping element, said handles forming reservoirs for the cleaning or anti-freezing fluid for permitting the fluid to be supplied to the wiping element by capillary action.

A still further object of the invention is to provide an improved wind shield wiper of the above character, which will be durable and efficient in use, one that will be simple and easy to manufacture and one which can be placed upon the market at a small cost.

With these and other objects in view, the invention consists in the novel construction, arrangement and formation of parts, as will be hereinafter more specifically described, claimed and illustrated in the accompanying drawings, in which drawings:

Figure 1 is a rear elevation of the improved wiper,

Figure 2 is a side elevation of the same showing the same applied to the wind shield, the wind shield being shown in vertical section, parts of the wiper being broken away and in section.

Figure 3 is an enlarged fragmentary rear elevation of the wiper showing the novel means employed for clamping the wiper in position on a wind shield, Figure 4 is a detail horizontal section taken on the line 4—4 of Figure 2 illustrating the means of mounting the wiping element in the holder and the means for connecting the holder to the resilient arms, Figure 5 is a detail vertical section taken on the line 5—5 of Figure 2 showing the casing with the operating gears mounted therein, Figure 6 is a side elevation of a slightly modified form of the device for use in connection with closed cars.

Referring to the drawings in detail, wherein similar reference characters designate corresponding parts throughout the several views the letter A generally indicates the improved wind shield cleaner and B a wind shield with which the same is associated.

The wind shield B forms no part of the present invention and has simply been shown to illustrate the use of the improved cleaner and the wind shield includes the usual glass panel 10 and frame 11 therefore which embodies the upper frame bar 12.

The improved wind shield cleaner A comprises a pair of resilient supporting and operating arms 15 and 16 which are adapted to be disposed on the opposite sides of the glass panel of the wind shield to be cleaned. The lower terminals of the resilient arms 15 and 16 are each provided with a pair of inwardly extending supporting ears 17 between which are confined the holders 18 for the wiping or cleaning elements 19. As clearly shown in Figures 2 and 3 of the drawing the holders 18 are pivotally connected to the pairs of ears 17 by means of pivot pins 20, for a purpose which will be hereinafter more fully described. The holders 18 each embody a vertically extending body formed of resilient material and this body includes spaced parallel walls 21 and an outer connecting wall 22. The inner longitudinal edges of the walls 21 are provided with flared lips 23 which form means for facilitating the placing of the cleaning or wiping element 19 in the body between the walls. In view of the fact that the body is formed of resilient material the parallel walls 21 serve as means for gripping the cleaning or wiping element so as to firmly hold the same in place. The wiping or cleaning element 19 is preferably formed from felt and is provided at its lower end with an angularly extending portion 24 which forms a wick, as will be hereinafter more fully described, for permitting the anti-freezing liquid to be supplied constantly to the cleaning or wiping element. As shown the lower end of each holder is provided with the outwardly extending integral nipple 25 which is preferably provided with external threads for receiving the hollow hand grip 26 which forms a reservoir for the cleaning and anti-freezing fluid. It is to be noted that the wick portion 24 of the cleaning or wiping element 19 extends within the said handle or reservoir. By this construction it can be seen that the cleaning or non-freezing fluid will be fed by capillary attraction to the said cleaning or wiping element of the wind shield cleaner.

As heretobefore stated one of the objects of the invention is to provide novel means for synchronously operating the arms, in such a manner that the arms will move in opposite direction, so as to insure proper cleaning of the wind shield and to prevent binding action of the wiping or cleaning elements 19 on the opposite faces of the glass panel. In order to efficiently bring about this result, a gear casing 30 is provided which supports the oppositely extending stub shafts 31 and 32. These stub shafts 31 and 32 have keyed or otherwise secured thereto pinions 33 which are disposed in intermeshing engagement with one another. The stub shaft 32 has adjustably secured thereto in any desired way for rotation therewith the arm 16, while the shaft 31 has rigidly and adjustably secured to the shaft 31 for rotation therewith the arm 15. As shown the outer terminals of the shafts are preferably reduced and threaded for the reception of jam nuts 34 which are adapted to engage the arms 15 and 16 to clamp the same on the said shafts. The gear casing 30 is provided with a suitable removable cover plate 35 as shown in Figure 2 of the drawing.

By this construction it can be seen that when either one of the handles 26 of the cleaner is grasped and swung in an arc, that both of the arms 15 and 16 will be synchronously operated and moved in opposite direction which will bring about the desired results. It is to be understood, that while I have described the device as being manually operated, the same can be automatically operated by an electric or suction operated motor.

I also provide novel means for clamping the improved wind shield cleaner in place and as shown the gear casing 30 carries rearwardly extending bolts 36 which are fitted within slots 37 in a clamping plate 38. This clamping plate 38 has its lower end shaped to conform to the configuration of the upper bar 12 of the frame 11 of the wind shield B and this plate is adapted to be adjusted toward and away from the gear casing 30 and in a vertical plane so as to permit the same to readily grip different sized wind shield frames. The clamping plate 38 is held in proper clamping relation by the use of suitable nuts 39 threaded upon the bolts 36. It is to be noted that the casing 30 is disposed on one side of the wind shield frame while the clamping plate is disposed on the other side of the frame and that the gear casing and the clamping plate form jaws for engaging the opposite faces of the wind shield frame. It might be also well to point out that the bolts 36 form the means for retaining the cover 35 in position and that suitable nuts 40 are threaded upon the bolts into engagement with said cover.

Other means can be utilized for connecting the improved device in place and in Figure 6 I have shown means for connecting the same to an automobile of the closed type. In this form the casing 30 is lower, so that the same will not project above the wind shield and the fastening bolt 36 and the shaft 31 were extended directly through the upper fastening bar 12 of the wind shield as clearly shown in this figure.

While I have stated that the hollow handles or reservoirs 26 are adapted to receive a non-freezing fluid, so as to prevent freezing of rain and the like on the wind shield, it is to be understood that the reservoir can be filled in summer time with a fluid to prevent the adhering of rain and moisture on the wind shield.

It is to be noted, that owing to the means for pivotally connecting the holders 18 to the arms, that the wiping elements will correctly engage the wind shield irrespective of whether the clamp is disposed on a direct vertical plane or not.

From the foregoing description, it can be seen that I have provided an efficient wind shield cleaner which will operate in a novel manner and serve as means for supplying a fluid to the opposite face of the wind shield at all times to prevent the freezing and adhering of snow and the like thereon.

Changes as to details may be made without departing from the spirit or the scope of this invention.

What I claim as new is:

1. A windshield cleaner comprising a gear casing, clamping means for connecting the gear casing to the windshield, oppositely extending stub shafts rotatably carried by the casing having their opposite ends projecting outward from the opposite sides of the casing, depending arms secured to the extended ends of the stub shafts for rotation therewith, intermeshing pinions keyed to the stub shafts, holders secured to the lower ends of the arms, and windshield wiping and cleaning elements carried by the holders for engaging the opposite faces of the windshield.

2. In a windshield cleaning device, a holder, a wiping element frictionally mounted in the holder for engaging the windshield to be cleaned, an angularly extending nipple formed on the lower end of the holder, a hollow handle detachably connected with the nipple forming a reservoir for a fluid, and an extension formed on the lower end of the wiping element disposed in the handle for feeding the liquid contained therein to the wiping element by capillary attraction.

In testimony whereof I affix my signature.

ELLIOT McKENZIE.